United States Patent Office 3,268,570
Patented August 23, 1966

3,268,570
PREPARATION OF CYCLIC HYDROXYLATED SILOXANES
Donald R. Weyenberg, Midland, Mich., assignor to Dow Corning Corporation, Midland, Mich., a corporation of Michigan
No Drawing. Filed Mar. 29, 1962, Ser. No. 183,421
2 Claims. (Cl. 260—448.2)

This invention relates to novel cyclic siloxanes containing silicon-bonded hydroxyl groups.

It is the object of this invention to prepare new compositions of matter which are useful as water repellents and as intermediates in the preparation of polymeric siloxanes.

This invention relates to compositions of the formula

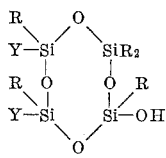

in which R is a monovalent hydrocarbon radical or a monovalent halohydrocarbon radical and Y is OH or R at least one Y being R.

The compositions of this invention can be made by two methods. The first method involves the reaction of a diol of the formula $R_2Si(OH)_2$ with a chlorosilane of the formula $RSiCl_3$ in equimolar amounts in a mutual solvent and in the presence of a hydrogen halide acceptor. Under these conditions the diol reacts with the trichlorosilane to produce the tetrasiloxane of the formula

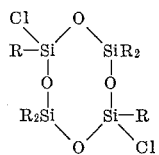

This process is preferably employed to prepare symmetrical cycles.

The chlorine-containing cyclic is then hydrolyzed to the diol by dissolving it in a solvent and hydrolyzing carefully with water at low temperature. If desired, a hydrogen halide acceptor can also be employed in this hydrolysis step. In carrying out these reactions suitable solvents include hydrocarbons such as petroleum ether, benzene, toluene and xylene; ethers such as diethylether or dibutylether and halohydrocarbons such as methylene chloride or perchloroethylene. Suitable hydrogen halide acceptors include ammonia, pyridine, α-picoline or quinoline.

A second method of preparing the cyclics of this invention is to cohydrolyze a dichlorosilane of the formula $R_2SiCl_2$ with a dichlorosilane of the formula $RHSiCl_2$. This hydrolysis is best carried out in solvent so as to promote the formation of cyclics. Under these conditions mixed cyclic siloxanes are obtained having the formulae

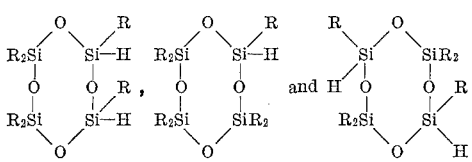

These mixed cyclosiloxanes can then be converted to the corresponding siloxanols by reacting the SiH group with water in the presence of catalysts such as platinum, palladium, ruthenium and rhodium as is fully described in the copending application Serial No. 183,419 of Garrett H. Barnes, Jr., and Robert L. Merker entitled "A Method of Preparing Silanols" filed concurrently herewith the entire disclosure of which is incorporated by reference. Briefly, this method involves the reaction of the SiH with HOH to give $SiOH+H_2$. The reaction proceeds at temperatures ranging from below room temperature up to temperatures which will not cause condensation of the silanol groups to SiOSi.

For the purpose of this invention R can be any monovalent hydrocarbon radical such as alkyl radicals such as methyl, ethyl, butyl or octadecyl; unsaturated aliphatic hydrocarbon radicals such as vinyl, allyl, hexenyl, ethynyl and butadienyl; cycloaliphatic hydrocarbon radicals such as cyclopentyl, cyclohexyl, cyclohexenyl, methylcyclohexenyl and β-cyclohexylethyl; aryl hydrocarbon radicals such as phenyl, xenyl, naphthyl, anthracyl, tolyl or xylyl and aralkyl hydrocarbon radicals such as benzyl, β-phenylethyl, and β-penylpropyl. R can also be any haolgenated hydrocarbon radical such as chloromethyl, gamma-chloropropyl, bromocyclohexyl, perfluorovinyl, chlorocyclohexenyl, trifluoropropyl, pentafluorobutyl, dibromophenyl, pentachlorophenyl, tetrabromoxenyl, α,α,α-trifluorotolyl and dichlorodifluorocyclobutyl.

The following examples are illustrative only and should not be construed as limiting the invention which is properly delineated in the appended claims. The abbreviations Me for methyl and Ph for phenyl are employed below.

Example 1

To 409 g. of methyltrichlorosilane in 700 cc. of dry benzene there was added a solution of 216 g. of diphenylsilane diol in 158 g. of pyridine and 300 cc. of benzene. The diol solution was added over a 30 minute period at a temperature of 20° to 35° C. The slurry was stirred one hour, filtered and washed with benzene. The solvent was then removed and the residue distilled to give the cyclic siloxane

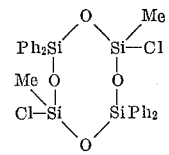

boiling at 233° to 237° C. at .3 mm.

A solution of 14.6 g. of this cyclic in 40 ml. of ether was added to a solution of 200 cc. of diethylether, 4.05 cc. of pyridine, .9 cc. of water and 50 cc. of acetone. The addition was carried out over a period of 15 minutes and the resulting product was stirred for 30 minutes and then poured into ice water. The organic solvent solution was washed and then dried over sodium sulfate. The solvent was evaporated and the residue crystallized on stirring in an equal volume of pentane. The crystalline product was recrystallized from a mixture of 70 percent aliphatic hydrocarbon and 30 percent benzene. The product melted at 129° to 137° C. and was composed of mixed cis- and trans-isomers of the structure

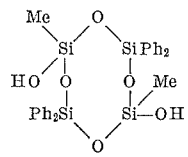

Example 2

13.6 g. of the cyclic 1,5-dimethyl-3,3,7,7-tetraphenyl-cyclotetrasiloxane was dissolved in 135 ml. of dioxane and 9.5 ml. of water was added. The mixture was stirred at 2.5 g. of a dispersion of 4 percent by weight palladium on charcoal was added in 5 increments over a two-day period. At the end of this time the test for SiH was negative and the product was filtered and the solvent removed by evaporation. The solid product was recrystallized from two liters of petroleum ether to give a crystalline product which was a mixture of needles and granular crystals. These represented the two isomers, namely the cis- and trans-isomers. Each crystal form melted at 148° to 149° C., however, a mix melting point on the needles and the granules was found to have a melting point of 130° to 133° C. This product was the cyclic 1,5-dimethyl-3,3,7,7-tetraphenylcyclotetrasiloxane-1,5-diol.

*Example 3*

When following trichlorosilanes are reacted with the following diols in accordance with the procedure of Example 1 and the resulting cyclotetrasiloxanes are hydrolyzed in accordance with that example, the following cyclic diols are obtained:

| Trichlorosilane | Diol | Cyclic diol |
|---|---|---|
| Vinyltrichlorosilane. | Phenylmethylsilane diol. | 1,5-divinyl-3,7-dimethyl-3,7-diphenylcyclotetrasiloxane-1,5-diol. |
| Cyclohexenyltrichlorosilane. | Phenylallylsilane diol. | 1,5-dicyclohexenyl-3,7-diallyl-3,7-diphenylcyclotetrasiloxane-1,5-diol. |
| Trifluorovinyltrichlorosilane. | Diphenylsilanediol. | 1,5-bis-trifluorovinyl-3,3,7,7-tetraphenylcyclotetrasiloxane-5,5-diol. |
| Styryltrichlorosilane. | ----do---------- | 1,5-distyryl-3,3,7,7-tetraphenylcyclotetrasiloxane-1,5-diol. |

*Example 4*

When the following SiH containing cyclotetrasiloxanes are reacted with water in accordance with the method of Example 2, the following products are obtained:

| Cyclic | Product |
|---|---|
| 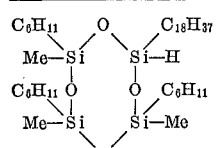 | 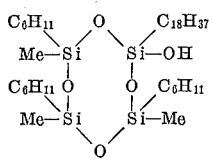 |
| 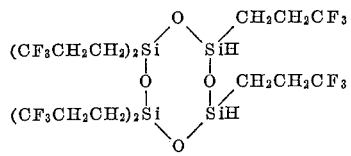 | 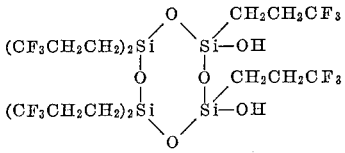 |
| 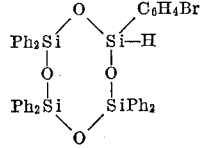 | 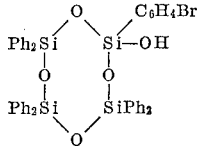 |
| 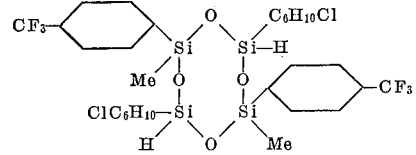 | 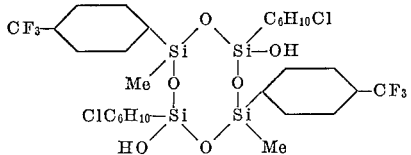 |
| 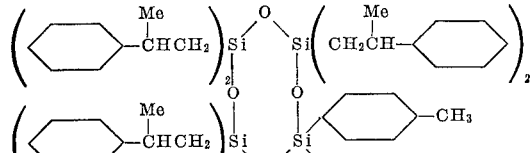 | 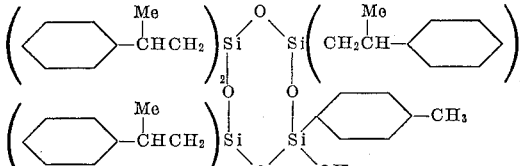 |
| 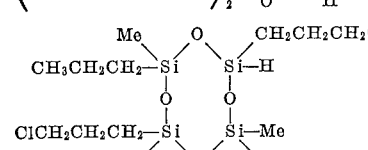 | 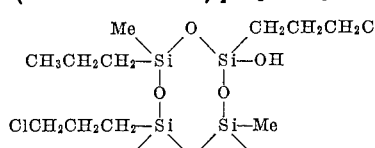 |

That which is claimed is:

1. A process for making a cyclic siloxane of the formula

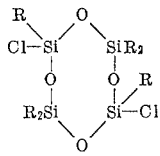

in which each R is selected from the group consisting of monovalent hydrocarbon and monovalent halohydrocarbon radicals, comprising reacting a diol of the formula $R_2Si(OH)_2$ with a chlorosilane of the formula $RSiCl_3$ in equimolar amounts in a mutual solvent, and in the presence of a hydrogen chloride acceptor.

2. A process for making a cyclic siloxane of the formula

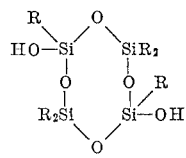

in which each R is selected from the group consisting of monovalent hydrocarbon and monovalent halohydrocarbon radicals, comprising reacting a diol of the formula $R_2Si(OH)_2$ with a chlorosilane of the formula $RSiCl_3$ in equimolar amounts in a mutual solvent, and in the presence of a hydrogen chloride acceptor, and then hydrolyzing the product so obtained.

References Cited by the Examiner

UNITED STATES PATENTS

| | | | |
|---|---|---|---|
| 2,684,379 | 7/1954 | Guillissen et al. | 260—448.2 |
| 2,954,391 | 9/1960 | Riley et al. | 260—448.2 |
| 3,037,962 | 6/1962 | Hartung et al. | |

OTHER REFERENCES

Eaborn, "Organosilicon Compounds," Academic Press Inc., New York, publ., 1960, page 237.

Sokolov, "Zhur. Obscheii Khim.," vol. 29 (1959), pp. 248–53.

TOBIAS E. LEVOW, *Primary Examiner.*

SAMUEL H. BLECH, *Examiner.*

J. G. LEVITT, *Assistant Examiner.*

UNITED STATES PATENT OFFICE
CERTIFICATE OF CORRECTION

Patent No. 3,268,570                      August 23, 1966

Donald R. Weyenberg

It is hereby certified that error appears in the above numbered patent requiring correction and that the said Letters Patent should read as corrected below.

Column 4, Table 3, under the heading Cyclic diol, line 9, for "5,5-diol" read -- 1,5-diol --.

Signed and sealed this 22nd day of August 1967.

(SEAL)
Attest:

ERNEST W. SWIDER
Attesting Officer

EDWARD J. BRENNER
Commissioner of Patents